(12) United States Patent
Kamimura et al.

(10) Patent No.: US 9,599,849 B2
(45) Date of Patent: Mar. 21, 2017

(54) DISPLAY DEVICE WITH A TOUCH SENSOR

(71) Applicant: Japan Display, Inc., Minato-ku (JP)

(72) Inventors: Takaaki Kamimura, Tokyo (JP);
Noriyuki Hirata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 66 days.

(21) Appl. No.: 14/614,611

(22) Filed: Feb. 5, 2015

(65) Prior Publication Data
US 2015/0219948 A1 Aug. 6, 2015

(30) Foreign Application Priority Data
Feb. 6, 2014 (JP) .................................. 2014-021058

(51) Int. Cl.
*G02F 1/1333* (2006.01)
*G02F 1/1343* (2006.01)
*G06F 3/041* (2006.01)

(52) U.S. Cl.
CPC .... *G02F 1/13338* (2013.01); *G02F 1/134336* (2013.01); *G06F 3/0412* (2013.01)

(58) Field of Classification Search
CPC ........ G06F 3/041; G06F 3/0412; G06F 3/044; G06F 3/047; G06F 2203/04103; G06F 2203/04112; G09G 3/36–3/3696; G02F 1/13338; G02F 1/1343–1/13439
See application file for complete search history.

(56) References Cited

U.S. PATENT DOCUMENTS

| 2005/0024572 | A1* | 2/2005 | Tak ................... G02F 1/133707 349/143 |
| 2007/0262967 | A1* | 11/2007 | Rho ....................... G06F 3/0412 345/173 |
| 2007/0268243 | A1* | 11/2007 | Choo ...................... G06F 3/044 345/104 |
| 2010/0182273 | A1 | 7/2010 | Noguchi et al. |
| 2010/0328256 | A1* | 12/2010 | Harada ................... G06F 3/044 345/174 |
| 2011/0001905 | A1* | 1/2011 | Tanaka ................ G02F 1/13439 349/96 |
| 2011/0249216 | A1* | 10/2011 | Nakamura ............ G02F 1/1333 349/61 |
| 2013/0342778 | A1* | 12/2013 | Itou .................... G02F 1/134363 349/42 |

(Continued)

FOREIGN PATENT DOCUMENTS

JP 4816668 B2 11/2011
KR 20110092768 A * 8/2011

*Primary Examiner* — Nathan Danielsen
(74) *Attorney, Agent, or Firm* — Oblon, McClelland, Maier & Neustadt, L.L.P.

(57) ABSTRACT

According to one embodiment, a display device includes a first substrate including a first insulating substrate, a second substrate including a second insulating substrate, a light modulation layer, a first electrode of a strip shape extending in a first direction, a plurality of conductive wiring lines extending in a second direction crossing the first direction, configured to selectively transmit a desired polarized light component of incident light, a second electrode configured to optically change the light modulation layer in cooperation with the first electrode, and a detection circuit configured to detect a change in capacitance between the first electrode and the conductive wiring lines.

20 Claims, 6 Drawing Sheets

(56) References Cited

U.S. PATENT DOCUMENTS

2014/0146013 A1   5/2014  Noguchi et al.
2014/0292718 A1  10/2014  Noguchi et al.
2015/0103032 A1* 4/2015  Bell .................. G06F 3/044
                                              345/174

* cited by examiner

DISPLAY DEVICE WITH A TOUCH SENSOR

CROSS-REFERENCE TO RELATED APPLICATIONS

This application is based upon and claims the benefit of priority from Japanese Patent Application No. 2014-021058, filed Feb. 6, 2014, the entire contents of which are incorporated herein by reference.

FIELD

Embodiments described herein relate generally to a liquid crystal display device.

BACKGROUND

In recent years, touch-sensor-equipped display devices with a touch sensor to detect contact of an object have been put to practical use. As an example, there has been proposed such a technique that a common electrode originally provided to apply voltage to a liquid crystal layer with a pixel electrode is used also as a sensor-driving electrode, and a capacitive sensor is constituted by the common electrode and a newly provided touch detection electrode. The capacitive sensor is configured to form a capacitance between the sensor-driving electrode and the touch detection electrode and detect a touch by utilizing a mechanism that the capacitance changes by touch of an object.

When such a touch-sensor-equipped display device is incorporated to electronic devices such as smartphones and tablet computers, a cover glass (referred to as decorative sheet in some cases) is provided above an entire surface of the touch-sensor display device, and the surface of the cover glass becomes a detection surface. Between the display device and the cover glass, an air gap may be formed or an adhesive is intermediated, etc. Therefore, there is a demand for further thinning of the device.

DETAILED DESCRIPTION

In general, according to one embodiment, a display device comprises: a first substrate comprising a first insulating substrate; a second substrate comprising a second insulating substrate comprising a first main surface opposing the first substrate, and a second main surface located at an opposite side to the first main surface to function as a detection surface; a light modulation layer provided between the first substrate and the second substrate; a first electrode of a strip shape extending in a first direction on a side of the first insulating substrate, which opposes the second substrate; a plurality of conductive wiring lines extending in a second direction crossing the first direction and aligned at substantially equal pitches on the first main surface of the second insulating substrate, configured to selectively transmit a desired polarized light component of incident light; a second electrode provided between the first insulating substrate and the second insulating substrate and configured to optically change the light modulation layer in cooperation with the first electrode; and a detection circuit configured to detect a change in capacitance between the first electrode and the conductive wiring lines.

According to another embodiment, a display device includes: a first substrate comprising a first insulating substrate, a first interlayer insulating film above the first insulating substrate, a first projection formed on the first interlayer insulating film and comprising a first sidewall surface, a second projection formed on the first interlayer insulating film to be aligned with the first projection in a first direction and comprising a second sidewall surface opposing the first sidewall surface, a first electrode of a strip shape formed from the first sidewall surface and the second sidewall surface over onto the first interlayer insulating film to extend in the first direction, a second interlayer insulating film configured to cover the first electrode, and a second electrode formed on the second interlayer insulating film; a second substrate comprising a second insulating substrate comprising a first main surface opposing the first substrate and a second main surface located at an opposite side to the first main surface to function as a detection surface; a plurality of conductive wiring lines extending in a second direction crossing the first direction on the first main surface of the second insulating substrate and aligned in the first direction, configured to output a change in capacitance between the first electrode and the conductive wiring lines as a sensor detection value; and a light modulation layer provided between the first substrate and the second substrate.

According to another embodiment, a method of manufacturing a display device, comprises: dividing a first mother substrate to obtain a first substrate comprising a first electrode of a strip shape extending in a first direction and a second electrode apart from the first electrode; dividing a second mother substrate to obtain a second substrate having an outer size different from that of the first substrate; applying a sealant in a loop manner on the first substrate or the second substrate; dropping a liquid crystal material on an inner region surrounded by the sealant; attaching the first substrate and the second substrate to each other; and curing the sealant.

Embodiments will now be described in detail with reference to the accompanying drawings. In the drawings, structural elements having the same or similar functions are denoted by like reference numbers, and an overlapping description is omitted.

Figure 1:
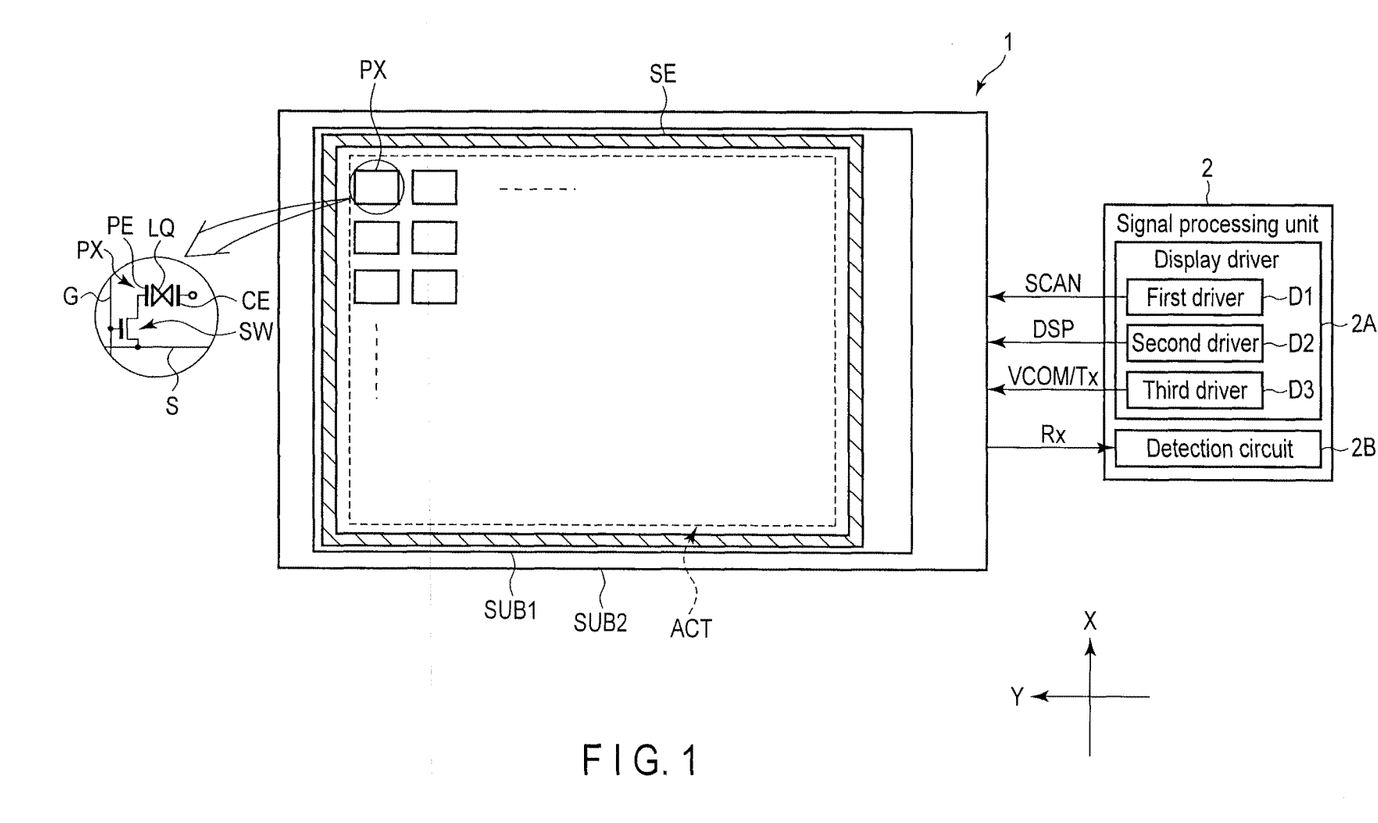
FIG. 1 is a view which schematically illustrates a structure example of a display device 1 according to an embodiment.

FIG. 1 is a view which schematically shows a structure example of a display device 1 according to an embodiment.

The display device 1 of the embodiment is, for example, a sensor-equipped active-matrix liquid crystal display device, which comprises a first substrate SUB1, a second substrate SUB2 disposed to oppose the first substrate SUB1 and a liquid crystal layer LQ held between the first substrate SUB1 and the second substrate SUB2 as an light modulation layer. The first substrate SUB1 and the second substrate SUB2 each have, for example, a rectangular planar shape with a length along a first direction X being shorter than a length along a second direction Y. Note that the first direction X intersects the second direction Y, and in this embodiment, they normally intersect each other. The second substrate SUB2 has an outer size larger than that of the first substrate SUB1, and extends outwards from the first substrate SUB1 in each of the first direction X and the second direction Y.

The first substrate SUB1 and the second substrate SUB2 are attached together with a sealant SE while a predetermined cell gap being formed therebetween. In the illustrated example, the sealant SE has a loop shape and is formed into a rectangular frame. The liquid crystal layer LG is held within a region surrounded by the sealant SE in the cell gap between the first substrate SUB1 and the second substrate SUB2. The display device 1 comprises an active area ACT which displays an image, within a region surrounded by the sealant SE. The active area ACT has, for example, a rectangular shape, and is composed of a plurality of pixels PX arranged in a matrix.

The first substrate SUB1 comprises a gate line G extending along the first direction X, a source line extending along the second direction Y, a switching element SW connected to the gate line G and the source line S in each of the pixels PX, a common electrode (first electrode) CE formed common over a plurality of pixels PX, a pixel electrode (second electrode) PE provided away from the common electrode CE and connected to the switching element SW. The pixel electrode PE has a function of optically changing the light modulation layer in cooperation with the common electrode CE. Note that the common electrode CE and the pixel electrode PE may not necessarily be provided in the same substrate.

A signal processor 2 is connected to the display device 1. Note that the signal processor 2 may be mounted on the display device 1, or may be connected to the display device 1 by wireless communications via an antenna. The signal processor 2 includes a display driver 2A and a detection circuit 2B, and is built in, for example, a driving IC chip integrally.

The display driver 2A is a signal supplying source which supplies a signal necessary for display drive of the display device 1, as well as a signal necessary for sensing. That is, the display driver 2A includes a first driver (gate driver) D1, a second driver (source driver) D2 and a third driver D3. In a display drive, which displays an image on the active area ACT, the first driver D1 supplies a scanning signal SCAN to the gate line G, the second driver D2 supplies an image signal DSP to the source line S, and the third driver D3 supplies a common drive signal VCOM to the common electrode CE. In a sensing drive, which detects approach or contact of an object in the active area ACT, the third driver D3 supplies a sensor driving signal Tx to the common electrode CE.

A detection circuit 2B, in a sensing drive, receives a sensor detection value Rx (more specifically, variation in capacitance described later), and obtains position data indicating where an object is approaching or position data indicating where an object contacts in the active area ACT based on the received sensor detection value Rx.

The display driver 2A and the detection circuit 2B may be formed separately, but when they are formed integrally as in this embodiment, the cost can be lowered and the space thereof can be smallened.

Figure 2:
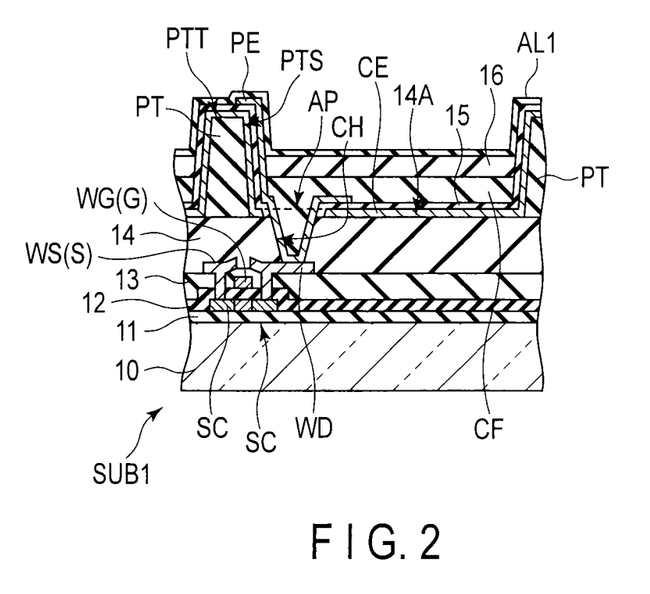
FIG. 2 is a cross-sectional view which schematically illustrates a cross-sectional structure of a first substrate SUB1 including a switching element SW of a display device 1 shown in FIG. 1.

FIG. 2 is a cross-sectional view which schematically illustrates a cross-sectional structure of the first substrate SUB1 including the switching element SW of the display device 1 shown in FIG. 1.

The first substrate SUB1 is formed by using a first insulating substrate 10, which is, for example, a transparent thin-plate glass substrate or resin substrate. The first substrate SUB1 comprises, above the first insulating substrate 10, a switching element SW, a common electrode CE, a pixel electrode PE, a first insulating film 11, a second insulating film 12, a third insulating film 13, a fourth insulating film 14, a fifth insulating film 15, a sixth insulating film 16, projections PT, color filters CF, a first alignment film AL1 and the like.

The first insulating film 11 is formed on an inner surface of the first insulating substrate 10. The switching element SW is formed on the first insulating film 11. The switching element SW shown here is, for example, a top-gate thin film transistor (TFT). The switching element SW comprises a semiconductor layer SC formed on the first insulating film 11. The semiconductor layer SC is formed of, for example, polysilicon, but may be formed of amorphous silicon or an oxide semiconductor, or the like. The semiconductor layer SC is covered by the second insulating film 12. The second insulating film 12 is disposed also on the first insulating film 11. Note that the switching element SW is not limited to the top-gate type, but may be a bottom-gate type.

A gate electrode WG of the switching element SW is formed on the second insulating film 12 and located directly above the semiconductor layer SC. The gate electrode WG is electrically connected to a gate line G, or formed integrally with the gate line G. The gate electrode WG and the gate line G are covered by the third insulating film 13. The third insulating film 13 is disposed also on the second insulating film 12.

A source electrode WS and a drain electrode WD of the switching element SW are formed on the third insulating film 13. The source electrode WS is electrically connected to a source line S, or formed integrally with the source line S. The drain electrode WD is provided away from the source line S. The source electrode WS and the drain electrode WD are in contact with the semiconductor layer SC via contact holes made through both the second insulating film 12 and the third insulating film 13. The source electrode WS, the source line S and the drain electrode WD are covered by the fourth insulating film 14. The fourth insulating film 14 is disposed also on the third insulating film 13. The fourth insulating film 14 has an upper surface 14A. The upper surface 14A is substantially a flat surface. The fourth insulating film 14 has a contact hole CH made through to the drain electrode WD. The fourth insulating film 14 is formed of, for example, a transparent resin material.

The projections PT are formed on, for example, the fourth insulating film 14. Each projection PT has sidewall surfaces PTS and a top surface PTT. The fourth insulating film 14 corresponds to a first interlayer insulating film which gives rise to a base of the projections PT.

The common electrode (first electrode) CE is formed continuously from the sidewall surfaces PTS and the top surface PTT of each projection PT over onto the fourth insulating film 14. Note that the common electrode CE has an aperture AP at a position which corresponds to the contact hole CH. The common electrode CE is covered by the fifth insulating film 15. The fifth insulating film 15 exposes the drain electrode WD in the contact hole CH. The pixel electrode (second electrode) PE is formed on the fifth insulating film 15. The pixel electrode PE is in contact with the drain electrode WD via the contact hole CH. The pixel electrode PE shown in the figure is formed along one of the sidewall surfaces PTS of the respective projection PT on the fifth insulating film 15. The common electrode CE and the pixel electrode PE are each formed of a transparent conductive material such as indium-tin-oxide (ITO) or indium-zinc-oxide (IZO). The fifth insulating film 15 corresponds to a second interlayer insulating film interposed between the common electrode CE and the pixel electrode PE.

The color filters CF are each disposed between the first insulating substrate 10 and a first alignment film AL1. In the example shown in the figure, each color filter CF is disposed on the fifth insulating film 15 and the pixel electrode PE between neighboring projections PT. The color filters CF are formed of resin materials colored in red, green and blue, respectively, when, for example, a single display pixel is constituted by three-color sub-pixels of red, blue and green. In the case where a signal display pixel is constituted by four-color sub-pixels of, for example, red, blue, green and white, the color filters CF are formed of resin materials colored in red, blue and green, respectively, and further a resin material uncolored, for a portion corresponding to a white sub-pixel, or by removal of the resin material, or the like. The sixth insulating film 16 is disposed on the color filters CF. The sixth insulating film 16 is formed of a transparent resin material. The first alignment film AL1 is formed to cover the sixth insulating film 16 and also the fifth insulating film 15 and the pixel electrode PE formed along each projection PT.

Note that in the first substrate SUB1, the fourth insulating film 14 may be omitted, or the fourth insulating film 14 may be substituted by a color filter CF. Further, the fourth insulating film 14 may be formed of a transparent inorganic material such as silicon oxide film or silicon nitride film. When the fourth insulating film 14 is omitted or formed of a inorganic material to be relatively thin, it becomes unnecessary to form a contact hole CH, which has a large diameter, for the pixel electrode PE and the drain electrode WD to be in contact each other. Therefore, the area which contributes to display can be enlarged, or a higher definition can be achieved.

Note also that in the first substrate SUB1, the sixth insulating film 16 may be omitted, but with the sixth insulating film 16, it is possible to prevent leakage of impurities from the color filters and to planarize the surface of the first substrate SUB1.

Figure 3:
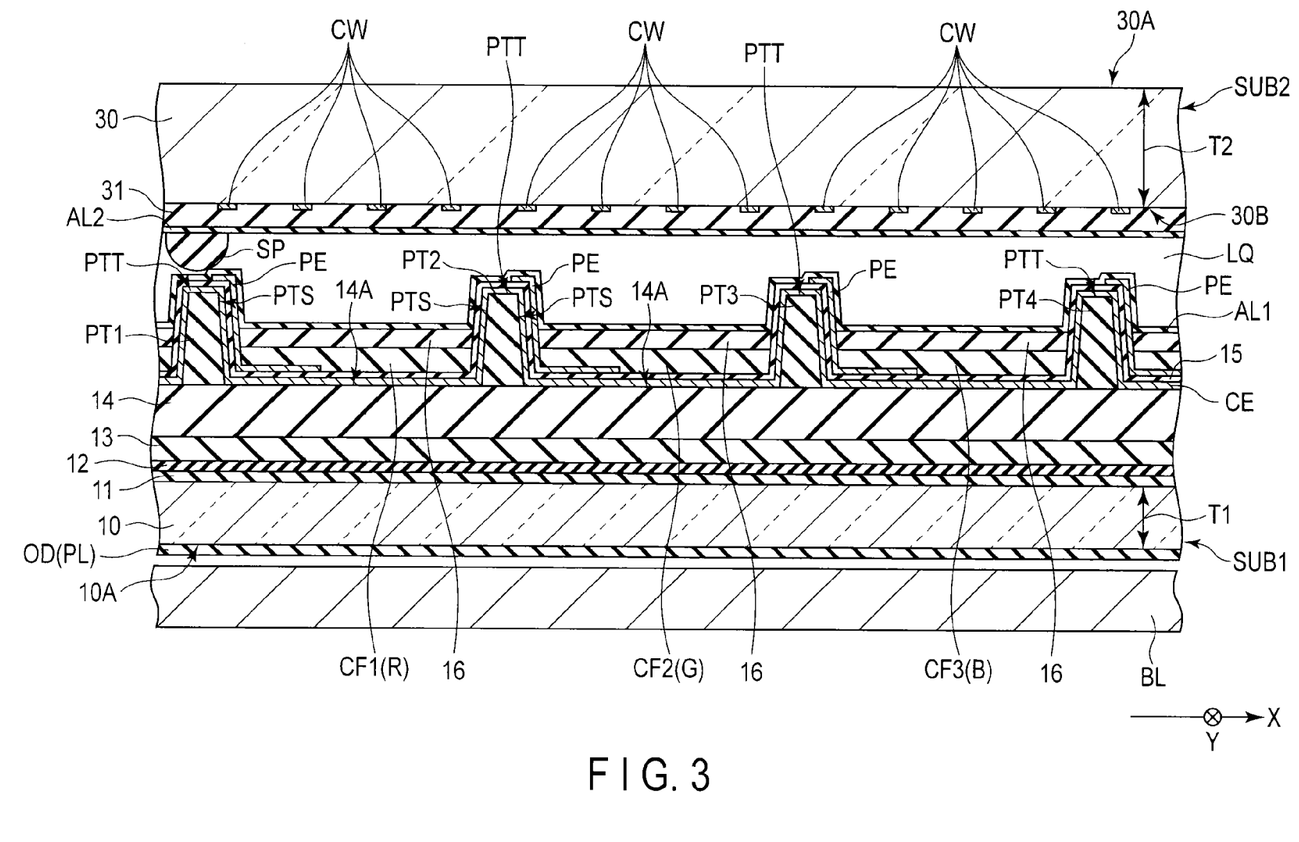
FIG. 3 is a cross-sectional view which schematically illustrates a cross-sectional structure of the display device 1 shown in FIG. 1 taken along a first direction X.

FIG. 3 is a cross-sectional view which schematically illustrates a structure of the display device 1 shown in FIG. 1 taken along the first direction X.

The first substrate SUB1 comprises, as mentioned above, the common electrode CE, the pixel electrode PE, the first insulating film 11, the second insulating film 12, the third insulating film 13, the fourth insulating film 14, the fifth insulating film 15, the sixth insulating film 16, projections PT1 to PT4, color filters CF1 to CF3, the first alignment film AL1 and the like, on a side opposing the second substrate SUB2 of the first insulating substrate 10.

The first insulating film 11, the second insulating film 12, the third insulating film 13 and the fourth insulating film 14 are stacked on the first insulating substrate 10 in this order.

The projections PT1 to PT4 are formed on the fourth insulating film 14. The plurality of projections PT1 to PT4 shown in the figure are formed in be aligned in the first direction X and each extended in the second direction Y. Note that the projections PT1 to PT4 may be extended in the second direction Y continuously or intermittently. The projections PT1 to PT4 may be constituted by either one of organic and inorganic materials, but since it is necessary to keep a predetermined thickness, they should preferably be formed of an organic resin. The projections PT1 to PT4 may be formed of a transparent resin, but when formed of a non-transparent resin, the drawback of mixture of colors between pixels can be avoided.

The common electrode CE extends in the first direction X, and is commonly provided for the pixels aligned in the first direction X. More specifically, the common electrode CE is formed on a top surface 14A of the fourth insulating film 14, and also along sidewall surfaces PTS and a top surface PTT of each of the projections PT1 to PT4. In other words, the common electrode CE is overlaid on the both sidewall surfaces PTS and the top surface of PTT of each projection. The common electrode CE is covered by the fifth insulating film 15. In this embodiment, the common electrode CE is used also as a sensor-driving electrode in addition to the function of applying voltage to the liquid crystal layer LQ held between the common electrode CE and the pixel electrode PE.

The pixel electrode PE is formed on the fifth insulating film 15. In the example shown in the figure, the pixel electrode PE is formed along the right sidewall surface PTS of each of the projections PT1 to PT4 on the fifth insulating film 15, but not provided on a position along the left sidewall surface PTS of each of the projections PT1 to PT4.

For example, in the figure, the right sidewall surface PTS of the projection PT1 opposes the left sidewall surface PTS of the projection PT2. The common electrode CE extends from each sidewall surface PTS of the projections PT1 and PT2 over onto the top surface 14A of the fourth insulating film 14. The pixel electrode PE is formed along a sidewall surface PTS of the projection PT1, but not formed in a position along the sidewall surface PTS of the projection PT2 opposing thereto. In other words, the pixel electrode PE formed along the projection PT1 opposes the common electrode CE formed along the projection PT2 via the liquid crystal layer LQ.

As regards the projection PT2, the common electrode CE and the fifth insulating film 15 are stacked along the left sidewall surface PTS, whereas the common electrode CE, the fifth insulating film 15 and the pixel electrode PE are stacked along the right sidewall surface PTS.

A color filter CF1 is, for example, a red (R) color filter, and disposed between the projection PT1 and the projection PT2. A color filter CF2 is, for example, a green (K) color filter, and disposed between the projection PT2 and the projection PT3. A color filter CF3 is, for example, a blue (B) color filter, and disposed between the projection PT3 and the projection PT4. The color filters CF1 to CF3 can be formed by, for example, the dropping of an ink jet method. The sixth insulating film 16 is stacked on the color filters CF1 to CF4.

The first alignment film AL1 covers the fifth insulating film 15, the sixth insulating film 16 and the pixel electrode PE. The first alignment film AL1 is formed of a material exhibiting a horizontal alignment property, and disposed on a surface contacting the liquid crystal layer LQ of the first substrate SUB1. The first alignment film AL1 is subjected to an alignment treatment by a non-contact technique such as an optical alignment. In this embodiment, the first substrate SUB1 has a irregular surface due to the projections PT1 to PT4, and when an alignment treatment by rubbing is applied, the treatment is regionally insufficient, which may cause alignment error of liquid crystal molecules. Therefore, by applying the non-contact alignment treatment by optical alignment or the like, the alignment treatment is not easily affected by the irregularities, making it possible to carry out the alignment treatment uniformly over the entire surface of the first alignment film AL1.

On the other hand, the second substrate SUB2 is formed by using a second insulating substrate 30. The second substrate SUB2 comprises a conductive wiring line CW, an overcoat layer 31, a second alignment film AL2 on a side of the second insulating substrate 30, which opposes the first substrate SUB1.

The second insulating substrate 30 is formed of tempered glass to be thicker than the first insulating substrate 10. As an example, the first insulating substrate 10 has a thickness T1 of 0.3 mm, whereas the second insulating substrate 30 has a thickness T2 of 0.5 mm or more. The second insulating substrate 30 has an inner surface (first main surface) 30B and an outer surface (second main surface) 30A. The inner surface 30A is located on a side opposing the first substrate SUB1. The outer surface 30B is located on a side opposite to the inner surface 30B. The outer surface 30A is not covered by any type of optical materials, a thin film or the like, but is equivalent to a detection surface which detects touch or approach of an object.

Conductive wiring lines CW are formed in the inner surface 30B of the second insulating substrate 30. These conductive wiring lines CW extend along the second direction Y, and are aligned in the first direction X at equal pitches. These conductive wiring lines CW can be formed of a metal material such as aluminum, silver or magnesium, or a transparent conductive material such as ITO or IZO. Applicable methods for manufacturing the conductive wiring lines CW are deposition methods, photolithography and the like.

In this embodiment, the conductive wiring lines CW constitute a wire-grid polarizer which selectively transmits a desired polarized light component of incident light. For example, the pitch of the conductive wiring lines CW is set to 300 nm or less, more preferably, 20 to 250 nm. When the pitch of the conductive wiring lines CW is sufficiently less than the wavelength of the incident light (for example, wavelength range of 400 to 800 nm), light components of the incident light, which have an electric field vector normally crossing the conductive wiring lines CW (p polarization) are transmitted, whereas light components which have an electric field vector parallel to the conductive wiring lines CW (s polarization) are reflected.

The conductive wiring lines CW also function as a detection electrode to output, as a sensor detection value, a change in capacitance between each conductive wiring line CW and the common electrode CE in sensing. That is, the conductive wiring lines CW each constitute a capacitive touch sensor together with the common electrode CE. The conductive wiring lines CW each oppose the common electrode CE located on the top surface 14A of the fourth insulating film 14 or the common electrode CE located on the top surface PTT of each projection PT. Between each conductive wiring line CW and the common electrode CE, dielectric materials such as the first alignment film AL1, the overcoat layer 31, the second alignment film AL2 and the liquid crystal layer LQ are mediated.

Note that the conductive wiring lines CW may be formed on the outer surface 30A of the second insulating substrate 30.

The overcoat layer 31 covers the inner surface 30B of the second insulating substrate 30 and the conductive wiring lines CW. The overcoat layer 31 planarizes irregularities made by the conductive wiring lines CW. The overcoat layer 31 is formed of a transparent resin material.

The second alignment film AL2 covers the overcoat layer 31. The second alignment film AL2 is formed of a material which exhibits a horizontal alignment property, and disposed on a surface contacting the liquid crystal layer LQ of the second substrate SUB2. The second alignment film AL2 is subjected to an alignment treatment by a technique such as rubbing or an optical alignment.

Although not shown in the figure, the second substrate SUB2 may comprise a light-shielding layer which partitions the pixels PX from each other in the active area ACT.

The first substrate SUB1 and the second substrate SUB2 described above are disposed so that the first alignment film AL1 and the second alignment film AL2 face each other. The first substrate SUB1 and the second substrate SUB2 are mediated by a spacer SP, and thus a predetermined cell gap is formed. The spacer SP is formed on, for example, a side of the second substrate SUB2, which opposes the first substrate SUB1, but the spacer SP may be formed on a side of the first substrate SUB1, which opposes the second substrate SUB2. The spacer SP is formed, for example, in dots, and is provided at a position overlapping some of the projections PT1. That is, the cell gap is formed as the spacer SP and a projection PT face each other.

The first substrate SUB1 and the second substrate SUB2 are attached together with a sealant while the cell gap is formed. The liquid crystal layer LQ is sealed in the cell gap between the first alignment film AL1 and the second alignment film AL2.

On the outer surface 10A of the first insulating substrate 10, an optical device OD including a polarizer PL is disposed. The polarizer PL may be constituted by the wire-grid polarizer which uses the above-described conductive wiring lines CW, or a polarizing plate containing iodine-adsorbed polyvinylalcohol (PVA) as a polarizing layer may be applied. The polarizer PL to which the wire-grid polarizer is applied may be formed on the inner surface of the first insulating substrate 10.

On a back side of the first insulating substrate 10, a backlight unit BL is disposed. As the backlight unit BL, various types can be applied, including that utilizes a light-emitting Diode (LED) or a cold cathode fluorescent lamp (CCFL) as the light source. Detailed descriptions of its structure will be omitted.

As an example of the display device 1 having the above-described structure, the operation of a normally-black mode will now be described.

In an OFF state in which an electric field is not formed between a pixel electrode PE and a common electrode CE, the liquid crystal molecules contained in the liquid crystal layer LQ are set in an initial alignment by an alignment regulation force of the first alignment film AL1 and the second alignment film AL2. The liquid crystal layer LQ is constituted such that, for example, the retardation thereof becomes substantially zero in this state. Under the condition of a crossed Nicols state where the polarization axis of the polarizer PL and the polarization axis of the wire-grid polarizer constituted by the conductive wiring lines CW normally cross each other, part of linearly polarized light of light from the backlight BL passes through the polarizer PL and enters the liquid crystal layer LQ. The polarization state of the linearly polarized light which enters the liquid crystal layer LQ does not substantially change, and therefore the linearly polarized light having passed through the liquid crystal layer LQ is reflected by the wire-grid polarizer (black display).

In an ON state where a potential difference is produced between a pixel electrode PE and a common electrode CE, a lateral electric field is formed between the pixel electrode PE and the common electrode CE face each other between neighboring projections. The lateral electric field acts on the liquid crystal layer LQ between the pixel electrode PE and common electrode CE. Thus, due to the action of the lateral electric field, the liquid crystal molecules are aligned in a direction different from that of the initial alignment. Here, the polarization state of the linearly polarized light having entered the liquid crystal layer LQ changes according to the alignment state of the liquid crystal molecules (or the retardation of the liquid crystal layer LQ). Therefore, at least the part of the light having passed the liquid crystal layer LQ passes the wire-grid type polarizer (white display). When the retardation of the liquid crystal layer LQ is $\lambda/2$ (where $\lambda$ represents the wavelength of the light passing the liquid crystal layer LQ), the transmissivity becomes maximum.

Note that in the display device 1, the polarization axis of the polarizer PL and the polarization axis of the wire-grid polarizer constituted by the conductive wiring lines CW may be set in parallel to each other. The display device 1 with such a structure can realize a normally white mode in which the white display is made by the OFF state.

Figure 4:
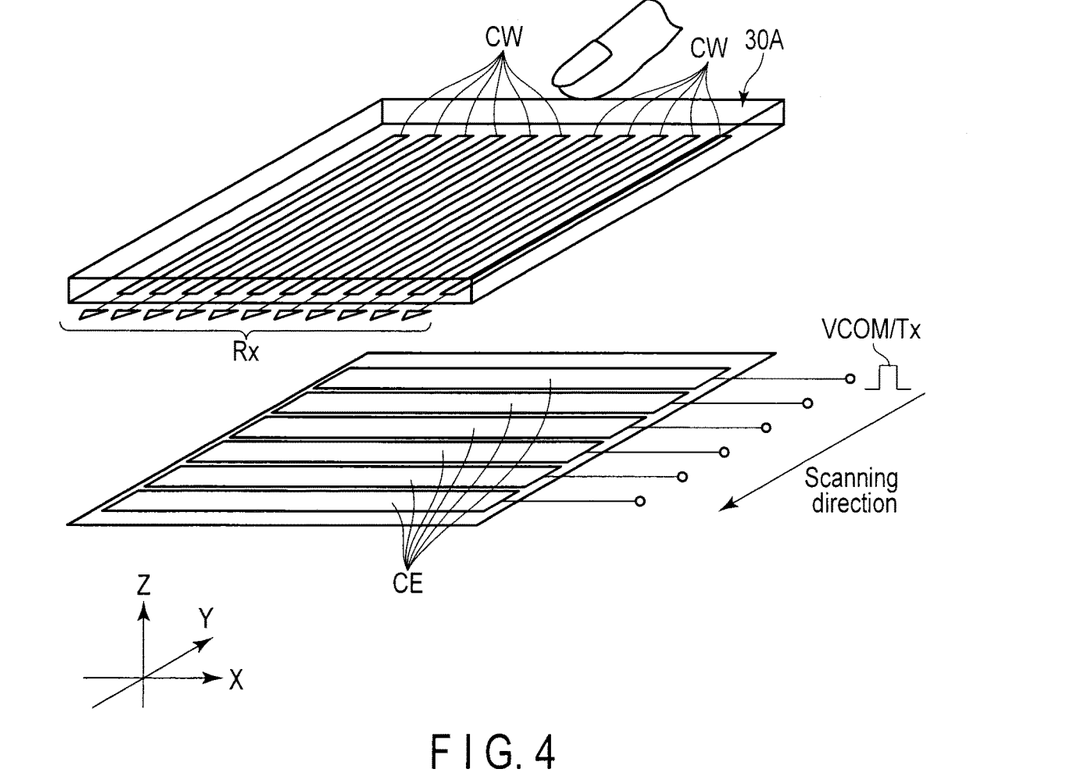
FIG. 4 is a perspective view which illustrates a structure example of common electrodes CE and conductive wiring lines CW.
Figure 5:
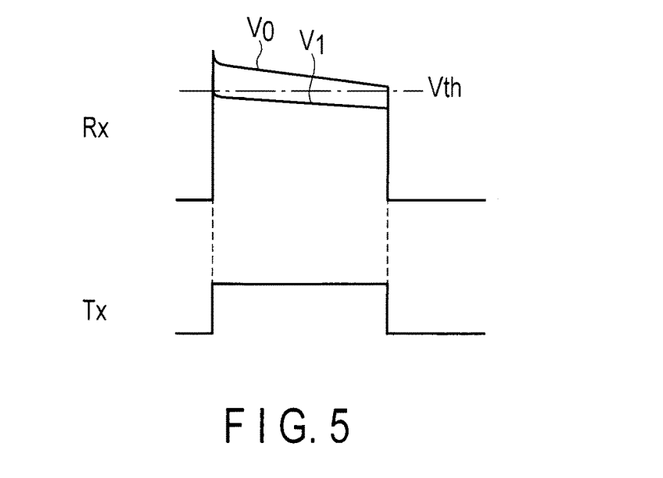
FIG. 5 is a view which illustrates an example of a drive signal and a detection signal of a capacitive sensor.

FIG. 4 is a perspective view which illustrates a structure example of the common electrodes CE and the conductive wiring lines CW shown in FIG. 3. FIG. 5 is a view which illustrates an example of a drive signal and a detection signal of a capacitive sensor.

Each of the common electrodes CE is formed in a strip extending in the first direction X. To each of the common electrodes CE, various types of signals are supplied individually from the display driver 2A. That is, at a display drive (timing of displaying an image), a common drive signal VCOM is applied from the display driver 2A to the common electrodes CE sequentially, and thus time-divisionally line-sequential scanning drives are carried out. At a sensing drive (timing of sensing), sensor drive signals Tx are sequentially supplied from the display driver 2A to the common electrodes CE.

Each of the conductive wiring lines CW is extended in the second direction Y which crosses orthogonal to the extending direction of the common electrodes CE. At the sensing drive, each of the conductive wiring lines CW outputs a sensor detection value Rx individually, to be input to the detection circuit 2B.

The capacitive sensor of this embodiment comprises a pair of electrodes disposed to oppose each other via a dielectric member interposed therebetween, that is, more specifically, a common electrode CE connected to the third driver (AC signal source) D3 and a conductive wiring line CW connected to the detection circuit 2B, which constitute the first capacitor. When a sensor drive signal Tx (AC rectangular wave) of a predetermined frequency (for example, about several kHz to several tens of kHz) is supplied from the third driver D3 to the common electrode CE, a sensor detection value Rx is output from the conductive wiring line CW.

In a state where an object (a finger in the example shown) is not in contact with the outer surface 30A, a current according to the capacitance value of the first capacitor flows when the first capacitor is charged and discharged. At this time, the waveform of the potential of the conductive wiring line CW is, for example, a waveform V0 shown in FIG. 5, which is detected to be a sensor detection value Rx by the detection circuit 2B.

On the other hand, in a state where an object is in contact with the outer surface 30A (or the object is close to the outer surface 30A), the second capacitor formed by the finger is added serially to the first capacitor. In this state, currents flow respectively when the first capacitor and the second capacitor are charged and discharged. At this time, the waveform of the potential of the conductive wiring line CW is, for example, a waveform V1 shown in FIG. 5, which is detected to be a sensor detection value Rx by the detection circuit 2B. The potential of the conductive wiring line CW is a divided potential determined by the currents flowing in the first capacitor and the second capacitor. Therefore, the waveform V1 has a value smaller than that of the waveform V0 in the non-contact state.

Based on the sensor detection value Rx from the conductive wiring line CW, the detection circuit 2B detects the contact position of the object on the outer surface 30A.

The example shown in FIG. 4 is described in connection with the case where a sensor drive signal is individually supplied to each of the common electrodes CE, and a sensor detection value is output from each of the conductive wiring lines CW. But the embodiment is not limited to this example. It is alternatively possible that, for example, sensor drive signals are supplied simultaneously to a plurality of common electrodes CE, and sensor detection values are output from a plurality of conductive wiring lines CW collectively. With this structure, the capacitance between the common electrodes CE and the conductive wiring lines CW can be increased, and therefore if the line widths of the common electrodes CE and the conductive wiring lines CW are thin, a high sensor sensitivity can be obtained.

Figure 6:
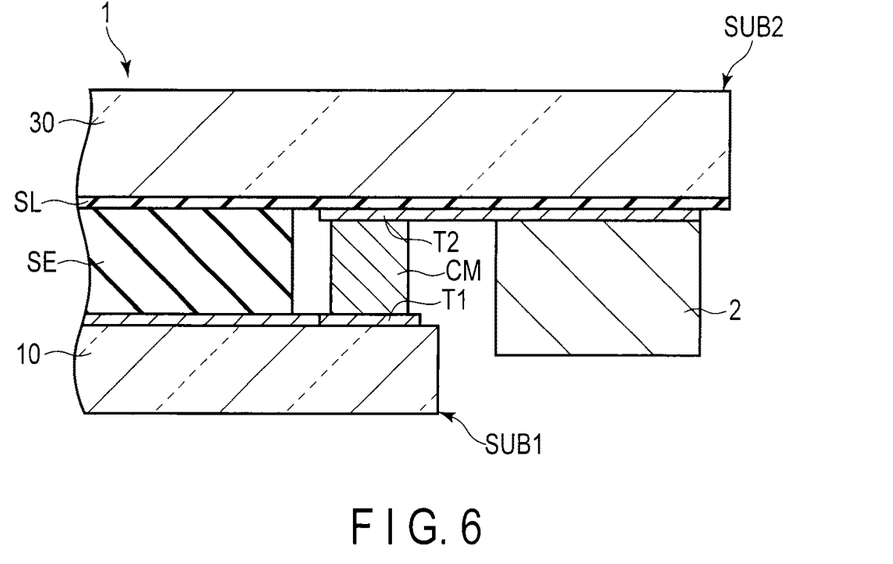
FIG. 6 is a cross-sectional view which schematically illustrates a structure example for connecting the display device 1 to the signal processor 2.

FIG. 6 is a cross-sectional view which schematically illustrates a structure example for connecting the display device 1 to the signal processor 2.

As shown, the first substrate SUB1 and the second substrate SUB2 are attached together with the sealant SE. The first substrate SUB1 comprises, on the inner surface side of the first insulating substrate 10, a terminal T1 connected to the gate line, source line or common electrode. In the example shown, the terminal T1 is located on an outer side of the sealant SE, but may be located on an inner side of the sealant SE. Note that the terminal T1 may be formed directly on the inner surface of the first insulating substrate 10, but one of the first to sixth insulating substrates may be interposed between the terminal T1 and the first insulating substrate 10.

The second substrate SUB2 comprises, on the inner surface side of the second insulating substrate 30, a peripheral light-shielding layer SL and a terminal T2. Note that the second substrate SUB2 further comprises a terminal connected to the conductive wiring lines CW though it is not shown. The peripheral light-shielding layer SL is formed into a frame shape surrounding the active area though the details thereof are not provided. The terminal T2 opposes the terminal T1, and also it is lead out to an outer side of the sealant SE, or more desirably, an outer side of the position opposing the first substrate SUB1. The terminal T2 and the terminal T1 are electrically connected to each other via a conductive material (for example, an isotropic conductive film) CM. The signal processor 2 is mounted to the terminal T2 on an outer side of the position opposing the first substrate SUB1. Note that the signal processor 2 may be mounted on a flexible printed circuit board.

Figure 7:
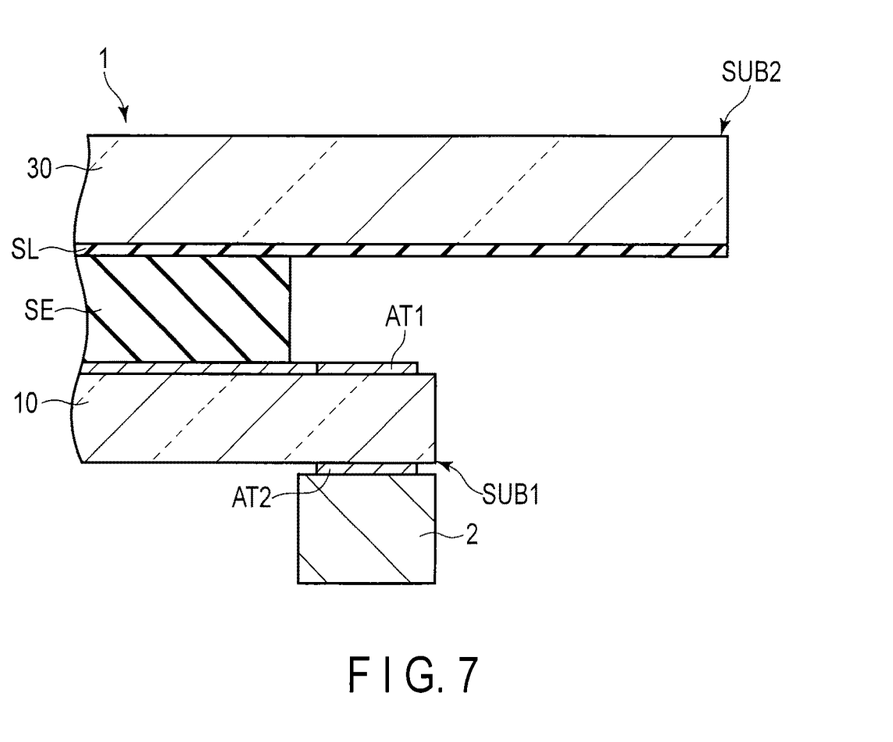
FIG. 7 is a cross-sectional view which schematically illustrates another structure example for connecting the display device 1 to the signal processor 2.

FIG. 7 is a cross-sectional view which schematically illustrates another structure example for connecting the display device 1 to the signal processor 2.

As compared to the structure example shown in FIG. 7, the structure example shown in FIG. 6 is different in that the first substrate SUB1 comprises an antenna AT1 connected to the above-described gate lines, source lines or common electrodes CE, and an antenna AT2 opposing the antenna AT1 via the first insulating substrate 10. That is, the antenna AT1 is formed on an inner surface side of the first insulating substrate 10, and is located on an outer side from the sealant SE. Note that the antenna AT1 may be formed directly on the first insulating substrate 10 as shown, or one of the first to six insulating films may be interposed between the antenna AT1 and the first insulating substrate 10. The antenna AT2 is formed on an outer surface side of the first insulating substrate 10, and opposes the antenna AT1. The antenna AT1 and the antenna AT2 can receive and transmit signals from and to each other by wireless communications. The signal processor 2 is electrically connected to the antenna AT2. In the example shown, the signal processor 2 is mounted on an outer surface side of the first insulating substrate 10. Note that the signal processor 2 may be mounted on a flexible printed circuit board.

Figure 8:
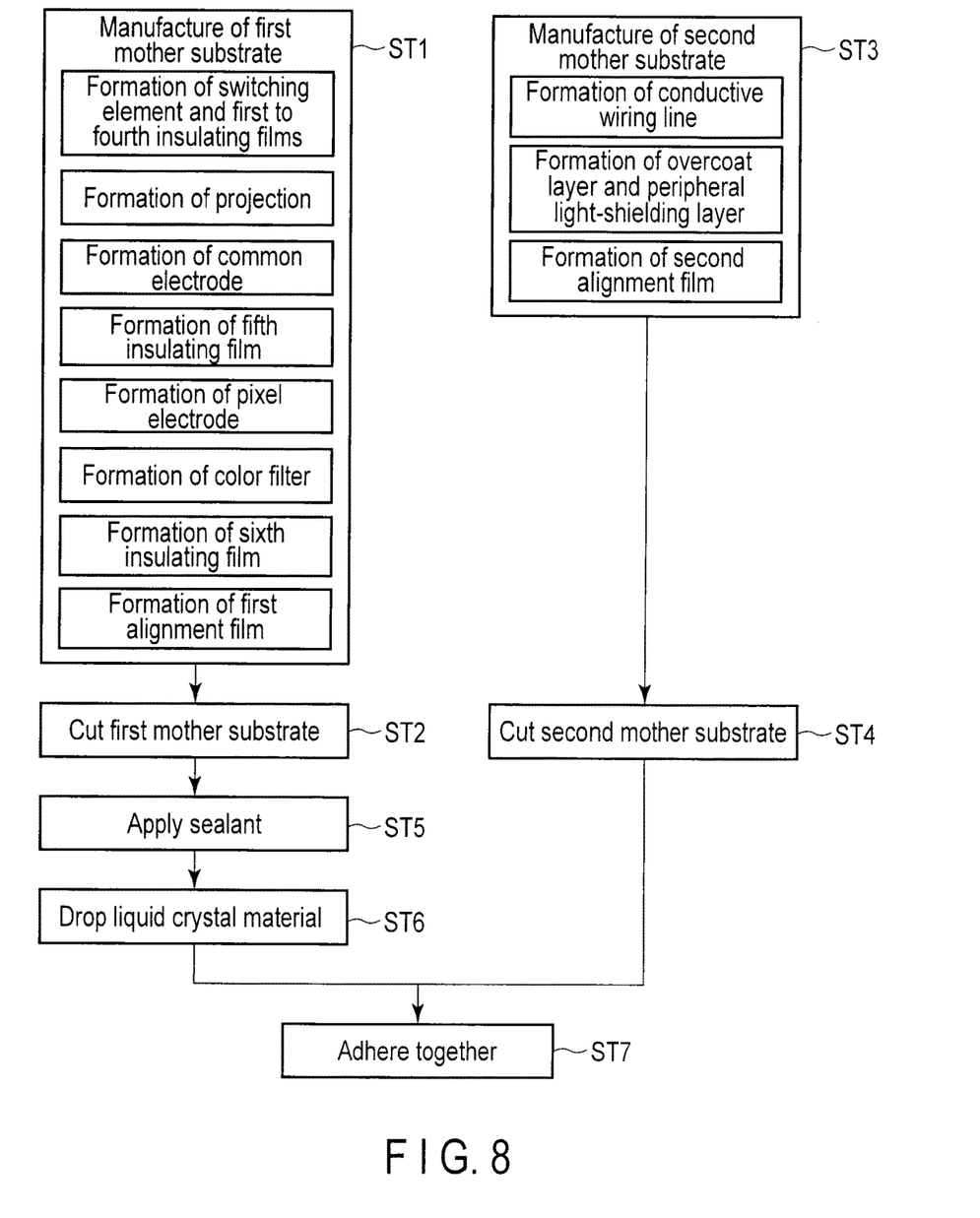
FIG. 8 is a view which illustrates an example of a method of manufacturing the display device 1 according to an embodiment.

Next, an example of the method of manufacturing the above-described display device 1 will now be described with reference to FIG. 8.

First, a first mother substrate is manufactured (ST1), and a plurality of first substrates SUB1 are obtained from the first mother substrate. That is, on a large-size insulating substrate, the first insulating film 11, the second simulation film 12, the third insulating film 13, the fourth insulating film 14, the switching element SW, etc., described above, are formed. After that, the projections PT are formed on the fourth insulating film 14, and the common electrodes CE are formed. Further, the fifth insulating film 15 is formed and the pixel electrodes PE are formed. Furthermore, the color filters CF1 to CF3 are formed and the sixth insulating film 16 is formed. After that, an alignment film material, which gives rise to the first alignment film AL1, is formed, and the film is subjected to an alignment treatment by optical alignment.

Then, the first mother substrate is divided to obtain first substrates SUB1 each comprising common electrodes CE and pixel electrodes PE (ST2).

Meanwhile, a second mother substrate is manufactured (ST3), and a plurality of second substrates SUB2 are obtained from the second mother substrate. That is, on a large-size reinforced glass plate, the conductive wiring lines CW are formed, and the overcoat layer 31, the peripheral light-shielding layer LS, etc. are formed. After that, an alignment film material, which gives rise to the second alignment film AL2, is formed, and the film is subjected to an alignment treatment by optical alignment.

Then, the second mother substrate is divided to obtain second substrates SUB2 each having an outer size larger than that of the first substrate SUB1 (ST4). The technique of dividing the first mother substrate and second mother substrate may be, for example, that which mechanically scribes the substrate and then applies a stress thereto, or that which applies a laser beam.

Subsequently, the sealant SE is applied on a first substrate SUB1 (ST5). The sealant SE is formed to have a loop shape. An applicable example of the material of the sealant SE is an ultraviolet curing resin material.

The liquid crystal material is dropped into an inner side section surrounded by the sealant SE of the first substrate SUB1 (ST6). After that, the first substrate SUB1 and the second substrate SUB2 are attached together under a vacuum environment (ST7). Here, first, while the first substrate SUB1 and the second substrate SUB2 are disposed to oppose each other, ultraviolet ray is applied to the sealant SE to promote the curing of the sealant SE for preliminary sealing. After that, the sealant SE is subjected to a heat treatment to cure primarily. The liquid crystal material dropped spreads over the entire area of the inner side of the sealant SE with the pressure applied to attach the first substrate SUB1 and the second substrate SUB2 together. Here, the spreading of the liquid crystal material is promoted by applying such a structure that projections PT formed on the first substrate SUB1 are intermittent along the second direction.

After that, for example, an optical device OD is attached to a rear surface of the first substrate SUB1, and thus the display device 1 is manufactured.

Note that in the above-described manufacturing method, the first alignment film AL1 may be formed after dividing the first mother substrate, and the second alignment film AL2 may be formed after dividing the second mother substrate. Further, the sealant SE may be applied to the second substrate SUB2, and the liquid crystal material may be dropped to the second substrate SUB2.

According to the display device 1 of this embodiment, the first substrate SUB1 comprises the strip-like common electrodes CE extending in the first direction and the pixel electrodes PE apart from the respective common electrodes CE, the second substrate SUB2 comprises the second insulating substrate (cover glass) 30 whose outer surface is a detection surface, and a light modulation layer is interposed between these substrates. With this structure, as compared to the structure which combines a display device which holds a light modulation layer between a pair of substrates, and a cover glass, the second insulating substrate has both functions of one substrate which holds the light modulation layer and the cover glass, thereby making it possible to thin the display device 1.

The conductive wiring lines CW of the second substrate SUB2 functions as a polarization plate which selectively transmit a desired polarized light component of incident light, and also functions as a detection electrode which outputs the change in capacitance between the detection electrode and the respective common electrode CE of the first substrate SUB1 as a detection electrode. With this structure, it is not necessary to provide a polarization plate on the light emitting side (the observer's side), or to newly provide a detection electrode. Therefore, the structure can be simplified.

Further, the common electrodes CE opposing the pixel electrode PE via the liquid crystal layer LQ are formed from the sidewall surface PTS of the respective projection PT over onto the upper surface 14A of the fourth insulating film 14. The common electrodes CE extend over onto the top surface PTT of the respective projection PT. The portions of the common electrodes CE which extend onto the upper surface 14A or the top surface PTT oppose the conductive wiring lines CW, which makes it possible to form a capacitance necessary for sensing.

According to the method of manufacturing a display device of this embodiment, the first substrate comprising the first electrode and the second electrode is obtained by dividing the first mother substrate, and the second substrate having an outer size larger than that of the first substrate is obtained by dividing the second mother substrate, followed by attaching the first substrate and the second substrate together. With this method, it is possible to increase the number of first substrates obtainable from the first mother substrate of the same size as compared to the case where a manufacturing method which, first, attaches the first mother substrate and the second mother substrate together, and then divides the attached substrates.

As described above, according to the embodiments, a thin display device and a method of manufacturing the same can be provided.

The above-provided descriptions are provided on the assumption that the display device 1 is a sensor-equipped liquid crystal display device. But the display device 1 may be some other type of display device such as an organic electroluminescence display device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate comprising a first insulating substrate, a switching element, a first interlayer insulating film covering the switching element, a first electrode on the first interlayer insulating film, a second electrode electrically connected to the switching element, and a first alignment film;
a second substrate comprising a second insulating substrate comprising a first main surface opposing the first substrate, and a second main surface located at an opposite side to the first main surface to function as a detection surface, a plurality of conductive wiring lines, and a second alignment film;
a light modulation layer provided between the first alignment film and the second alignment film; and
a signal processor electrically connected to the first substrate;
wherein
the first electrode of a strip shape extends in a first direction on a side of the first interlayer insulating film, which opposes the second substrate;
the plurality of conductive wiring lines extend in a second direction crossing the first direction, are aligned in the first direction at substantially equal pitches on the first main surface of the second insulating substrate, and are configured to selectively transmit a desired polarized light component of incident light;
the second electrode is provided between the first insulating substrate and the second insulating substrate and is configured to optically change the light modulation layer in cooperation with the first electrode;
the signal processor includes a gate driver, a source driver, a third driver, and a detection circuit;
the third driver supplies a sensor driving signal to the first electrode; and
the detection circuit is configured to detect a change in capacitance between the first electrode and the conductive wiring lines.

2. The display device of claim 1, wherein the second insulating substrate has an outer size larger than that of the first insulating substrate.

3. The display device of claim 1, wherein the second insulating substrate is thicker than the first insulating substrate.

4. The display device of claim 3, wherein
the signal processor is mounted to the second substrate on an outer side of position opposing the first substrate, and electrically connected to the first substrate via a conductive material.

5. The display device of claim 1, wherein
the first substrate further comprises a color filter between the first insulating substrate and the first alignment film.

6. The display device of claim 1, wherein
the first substrate further comprises a projection comprising a sidewall surface formed on the first interlayer insulating film; and
the first electrode is formed from the sidewall surface over onto the first interlayer insulating film.

7. The display device of claim 6, wherein
the second substrate further comprises a spacer opposing the projection.

8. The display device of claim 1, wherein
a pitch of the conductive wiring lines is 50 nm to 250 nm.

9. The display device of claim 1, further comprising a polarizer on a side of the first substrate, opposite to the side opposing the second substrate.

10. The display device of claim 1, wherein
the gate driver, the source driver, the third driver, and the detection circuit of the signal processor are mounted on a flexible printed circuit board.

11. The display device of claim 1, wherein
the light modulation layer is provided between the first electrode and the plurality of conductive wiring lines.

12. The display device of claim 1, wherein
the first substrate, the light modulation layer, the plurality of conductive wiring lines, and the second insulating substrate are arranged in this order.

13. A display device comprising:
a first substrate comprising a first insulating substrate, a switching element, a first interlayer insulating film covering the switching element, a first projection formed on the first interlayer insulating film and comprising a first sidewall surface, a second projection formed on the first interlayer insulating film to be aligned with the first projection in a first direction and comprising a second sidewall surface opposing the first sidewall surface, a first electrode of a strip shape formed from the first sidewall surface and the second sidewall surface over onto the first interlayer insulating film to extend in the first direction, a second interlayer insulating film configured to cover the first electrode, and a second electrode formed on the second interlayer insulating film and configured to optically change the light modulation layer in cooperation with the first electrode;
a second substrate comprising a second insulating substrate comprising a first main surface opposing the first substrate and a second main surface located at an opposite side to the first main surface to function as a detection surface, a plurality of conductive wiring lines, and a second alignment film;
a light modulation layer provided between the first alignment film and the second alignment film; and
a signal processor electrically connected to the first substrate;
wherein
the plurality of conductive wiring lines extend in a second direction crossing the first direction on the first main surface of the second insulating substrate, are aligned in the first direction, and are configured to output a change in capacitance between the first electrode and the conductive wiring lines as a sensor detection value;

the signal processor includes a gate driver, a source driver, a third driver, and a detection circuit;

the third driver supplies a sensor driving signal to the first electrode; and the detection circuit is configured to detect a change in capacitance between the first electrode and the conductive wiring lines.

14. The display device of claim 13, wherein the second electrode is formed along the first sidewall surface on the second interlayer insulating film, and opposes the first electrode along the second sidewall surface.

15. The display device of claim 13, wherein the second insulating substrate has an outer size larger than that of the first insulating substrate.

16. The display device of claim 13, wherein the second insulating substrate is thicker than the first insulating substrate.

17. The display device of claim 13, wherein
the first substrate further comprises a color filter between the first interlayer insulating film and the second interlayer insulating film.

18. The display device of claim 13, wherein
the second substrate further comprises a spacer opposing the first projection.

19. The display device of claim 13, wherein
the conductive wiring lines are aligned at a pitch of 50 nm to 250 nm in the first direction.

20. The display device of claim 13, further comprising a polarizer on a side of the first substrate, opposite to the side opposing the second substrate.

* * * * *